US006099198A

United States Patent [19]

Kotzur et al.

[11] Patent Number: 6,099,198

[45] Date of Patent: Aug. 8, 2000

[54] COMBINED CONNECTION FOR AXIALLY SPLIT CASINGS

[75] Inventors: Joachim Kotzur, Oberhausen; Alfred Schlemenat, Herten; Gerd-Ulrich Woelk, Oberhausen, all of Germany

[73] Assignee: GHH Borsig Turbomaschinen GmbH, Oberhausen, Germany

[21] Appl. No.: 09/103,256

[22] Filed: Jun. 23, 1998

[30] Foreign Application Priority Data

Jul. 5, 1997 [DE] Germany .......................... 197 28 779

[51] Int. Cl.7 ...................................................... B25G 3/20

[52] U.S. Cl. ............................................ 403/370; 403/367

[58] Field of Search .................................... 403/370, 369, 403/368, 367; 285/363, 368, 405, 412, 421

[56] References Cited

U.S. PATENT DOCUMENTS

| | | | |
|---|---|---|---|
| 3,390,830 | 7/1968 | Kahane . | |
| 3,998,563 | 12/1976 | Kloren | 403/370 |
| 4,652,021 | 3/1987 | Pido | 285/421 X |
| 5,489,156 | 2/1996 | Martinie | 403/370 X |
| 5,558,457 | 9/1996 | Mullenberg | 403/370 |

FOREIGN PATENT DOCUMENTS

| | | |
|---|---|---|
| 0 775 863 A1 | 5/1997 | European Pat. Off. . |
| 1 009 638 | 6/1957 | Germany . |
| 1 052 412 | 3/1959 | Germany . |
| 27 11 607 | 7/1978 | Germany . |

*Primary Examiner*—Anthony Knight
*Assistant Examiner*—Karlena D. Schwing
*Attorney, Agent, or Firm*—McGlew and Tuttle, P.C.

[57] ABSTRACT

A axially split casing with flange connection of two casing halves, wherein the casing upper part (1) is bolted to the casing lower part (2) with split line bolts (5) on the circumference of the axial split line flange (3). An axially divided casing extension (9), which is surrounded by a coaxially arranged axially unsplit ring (11) on the outer circumference, is arranged at one or both end faces (4) of the casing upper part (1) and the casing lower part (2) in the area of the casing axis (8). Wedge-shaped tensioning elements (14), which are tensioned by means of tension bolts (15) between surfaces (13) arranged in the ring (11) and countersurfaces (12) of the collar (10) of the casing extension (9), may be additionally arranged between surfaces (12, 13) arranged in the ring (11) and the collar (10) of the casing extension (9).

6 Claims, 5 Drawing Sheets

COMBINED CONNECTION FOR AXIALLY SPLIT CASINGS

FIELD OF THE INVENTION

The present invention pertains to an axially split casing with flange connection of the two casing halves.

BACKGROUND OF THE INVENTION

Axially split casings are used in, e.g., turbo machines when a complete rotor is to be inserted into the casing. The two casing halves are connected according to the state of the art with bolts via parting line flanges arranged at the split line and are sealed to the outside as a result.

The casing is, in general, subject to stresses due to internal pressure and internal temperature, which may lead in borderline cases to deformations of the casing, associated with gaping of the split line, especially on the end faces of the casing in the area of the shaft seals. Because of limited space, the split line bolts cannot be arranged there close enough to the shaft seal to bring about a sufficient sealing effect between the casing flanges and, in the case of a axially split shaft seal, also on its joint faces.

SUMMARY AND OBJECTS OF THE INVENTION

The primary object of the present invention is to provide a non-positive and a positive connection on the entire circumference of the joint face for casings with an axial split line.

This can be accomplished according to the present invention by a combined connection of the casing upper part and the casing lower part. The casing upper part is accordingly bolted to the casing lower part with split line bolts on the circumference of the axial split line flange, and a casing extension, which is surrounded on the outer circumference by a coaxially arranged, axially undivided ring, is arranged at one or both end faces of the casing upper part and of the casing lower part in the area of the casing axis.

The casing extension may also be formed, e.g., by radial ribs or in a similar manner. If, e.g., a cylindrical design of the extension is selected, this could be able to be reinforced by ribs.

To achieve better detachability of the unsplit ring, wedge-shaped tensioning elements with corresponding surfaces, which are tensioned by means of tension bolts between surfaces arranged in the ring and opposite surfaces of the collar of the casing extension, are arranged in another embodiment of the present invention between surfaces arranged in the ring and the collar of the casing extension.

If the contact surface between the collar of the casing extension is designed as a radially flat surface, only radial deforming forces are transmitted by the ring.

It shall be pointed out in this connection that EP 0 775 863 A1, which describes a non-positive and a positive, but at the same time readily detachable connection for rotationally symmetrical components, has been known from the manufacture of vessels. According to this patent, a plurality of small tensioning elements are tensioned at cylindrical projections of radially divided container halves between the contact surfaces by means of tension bolts, which are said to absorb pulling forces generated by overpressure in the direction of the axis of the vessel and to bring about sealing on the circumference of the vessel as a result.

Depending on the amount of space available and the distribution of forces, it may be useful in the case of the connection according to the present invention being described here to design the contact surface between the collar, the casing extension and the ring as a conical surface and to correspondingly tilt the axis of the tension bolts. The surface at the collar may be a radially flat surface.

Axial forces, which enter the ring and are present at the collar of the casing extension, occur in the case of conical contact surfaces, in addition to the radial forces.

To facilitate the detachment of the tensioning elements, threads for pulling-off screws may be provided in the holes for the tension bolts.

The contact surfaces of the tensioning elements and their countersurfaces at the collar and in the ring may be flat or be adapted to the shape of the limiting annular surface, generally a conical surface.

The number of tensioning elements and of the tension bolts is always adapted to the particular needs.

The casing extension and its collar may be cast in one piece together with the casing upper part and the casing lower part. However, they may also be attached thereto by welding, soldering or bolting.

All operating conditions, even transient ones, must be taken into account when dimensioning the ring.

The material of the ring, which may also be composed of a plurality of rings, is adapted to the operating conditions. A coefficient of thermal expansion deviating from that of the material of the casing and a different ductility are taken into account at the time of the optimization of the ring.

Exemplary embodiments of the combined connection according to the present invention for axially split casings will be explained below on the basis of the schematic drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
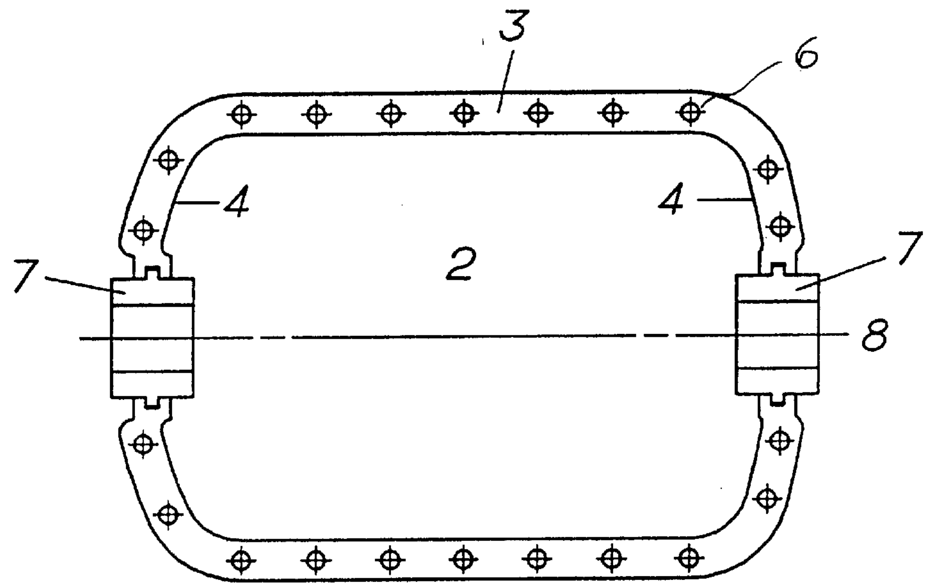
FIG. 1 is the view of the split line of a axially split casing according to the state of the art.

Referring to the drawings in particular, FIG. 1 shows the view of the split line of an axially split casing which itself is known according to the state of the art. The axially split casing is provided with holes 6 arranged in the split line flange 3 for the split line bolts 5. The shaft seals 7 along an axis 8 are inserted into the casing lower part 2 at the end faces 4.

Figure 2:
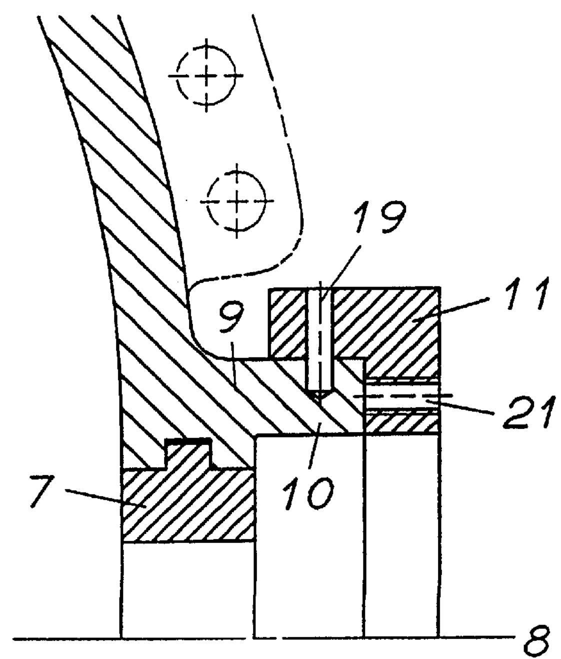
FIG. 2 is a sectional view taken through a casing according to the present invention.

FIG. 2 shows a section through a casing according to the present invention in the area of the shaft seal 7. A one-part ring 11, which is axially secured by pins 19, is arranged above the collar 10 of the here coaxial cylindrical casing extension 9. To pull off the ring 11, a hole 21 is provided for a pulling-off screw (not shown).

Figure 3:
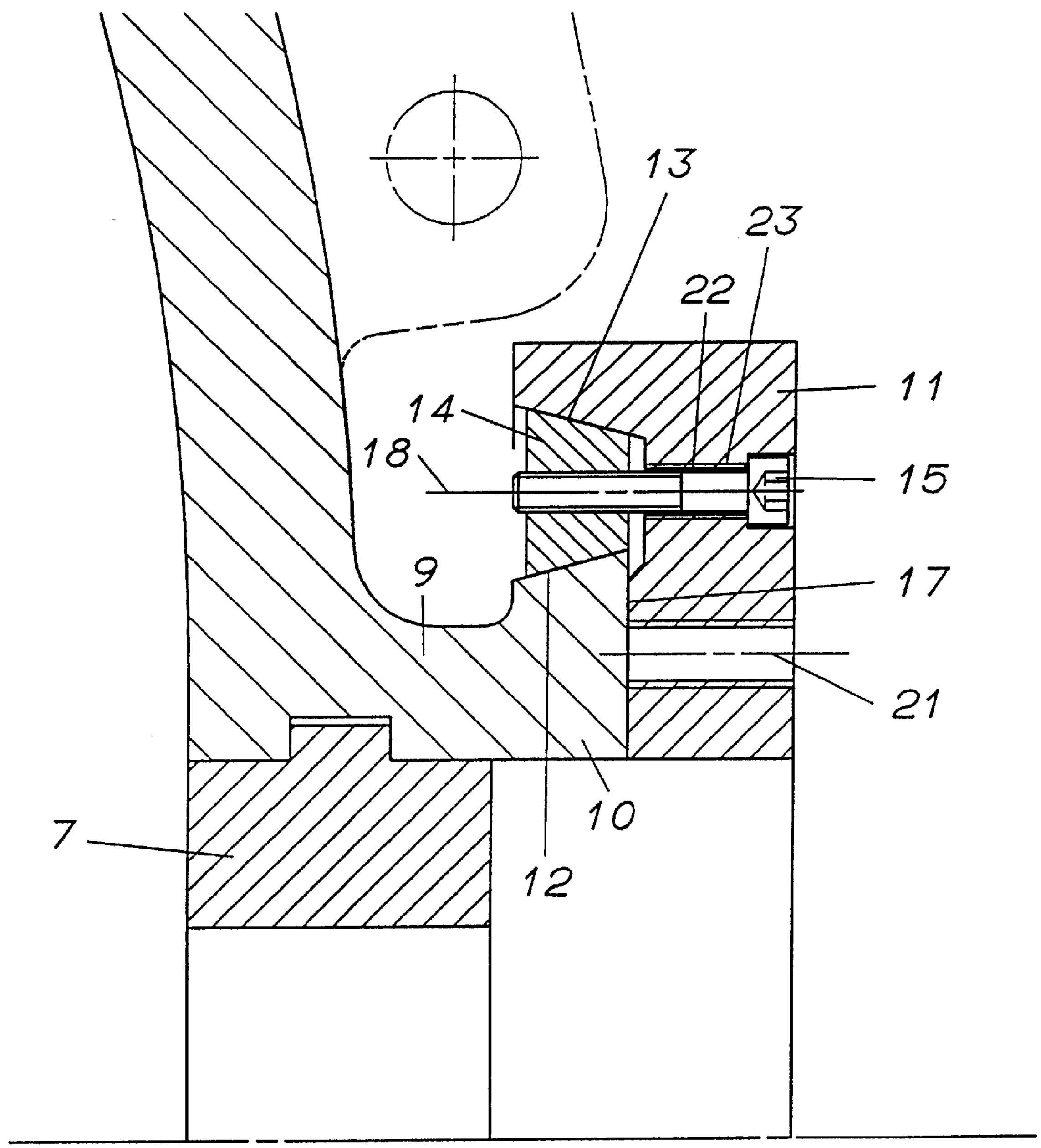
FIG. 3 is a sectional view of an embodiment according to the present invention with an additional bolt connection in the area of the shaft seal.

FIG. 3 shows the embodiment of the additional bolt connection in the area of the shaft seal 7. The axially unsplit ring 11 is arranged above the collar 10 of the casing extension 9. The ring 11 is pulled via tension bolts 15 along axis 18 against the radial contact surface 17 by means of tensioning elements 14 with slanted surfaces 13 and 12. A threaded hole 21 is provided for a pulling-off screw here. A thread 23 for a pulling-off screw is also prepared in the hole 22 for the tension bolt 15.

Other embodiments of the tension bolts, e.g., through bolts with nuts, etc., are, of course, also possible.

Figure 4:
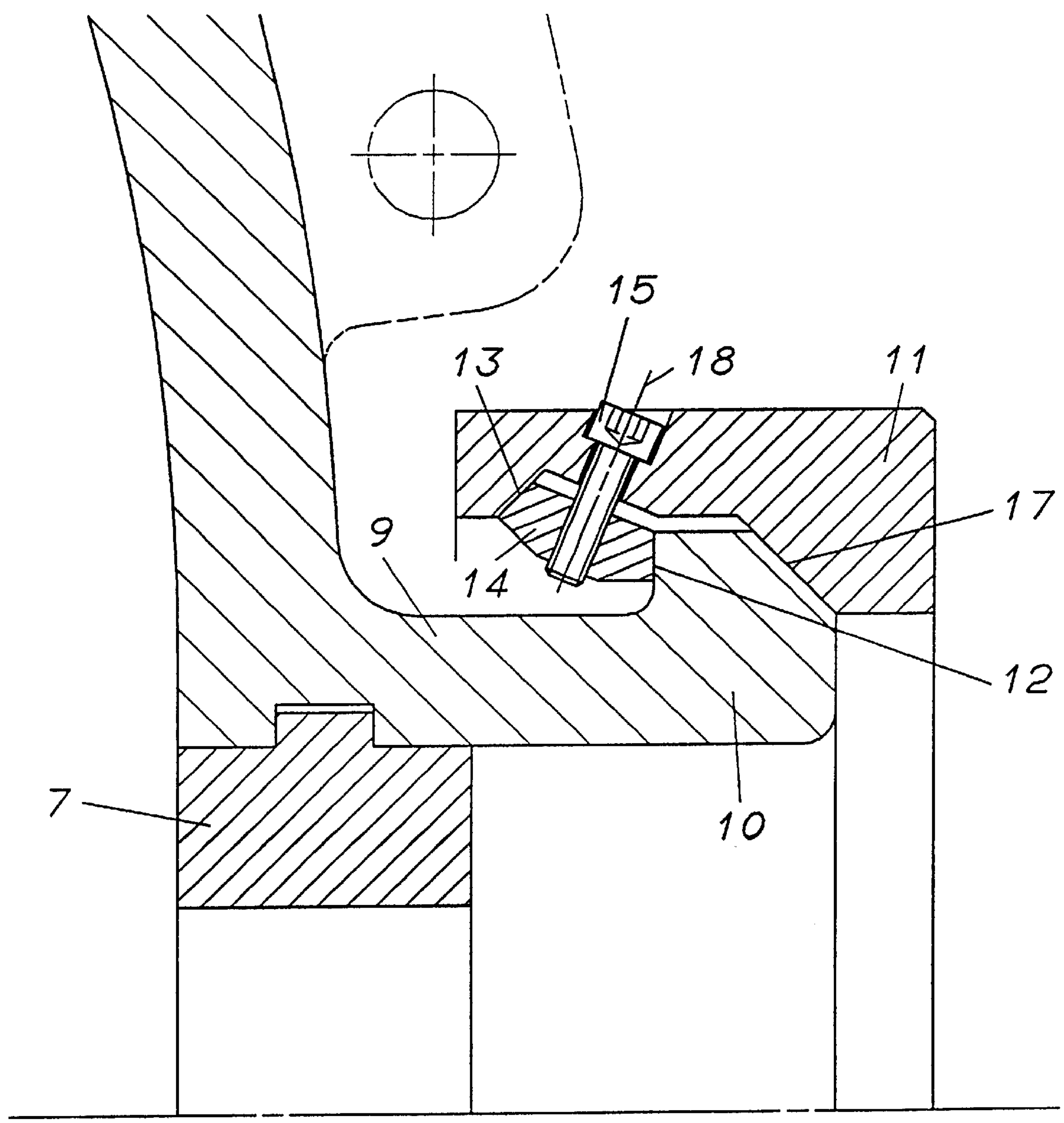
FIG. 4 is a sectional view of a variant for FIG. 3.

FIG. 4 shows an embodiment of the additional bolt connection in the area of the shaft seal 7. The contact surface 17 is made conical here. The tension bolts 15 and tensioning elements 14 are arranged tilted in this embodiment.

Figure 5:
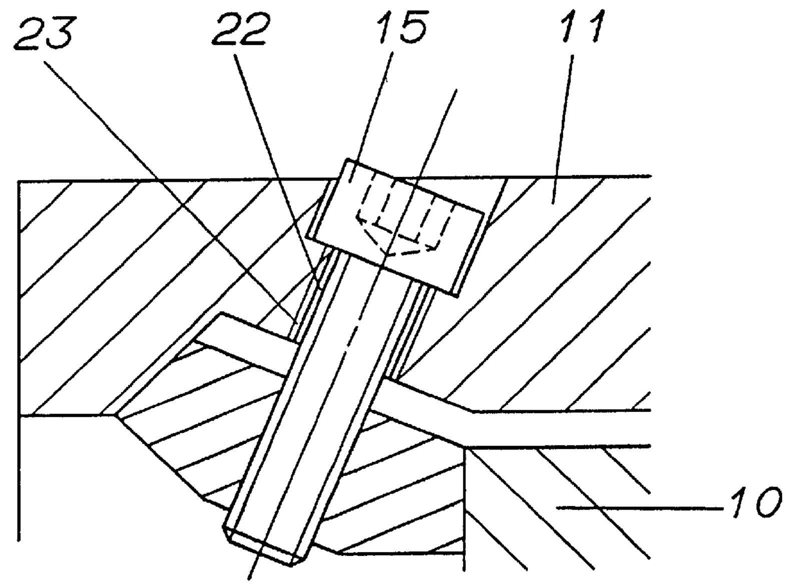
FIG. 5 is a sectional view of a tension bolt with an additional hole for a pulling-off screw.
Figure 6:
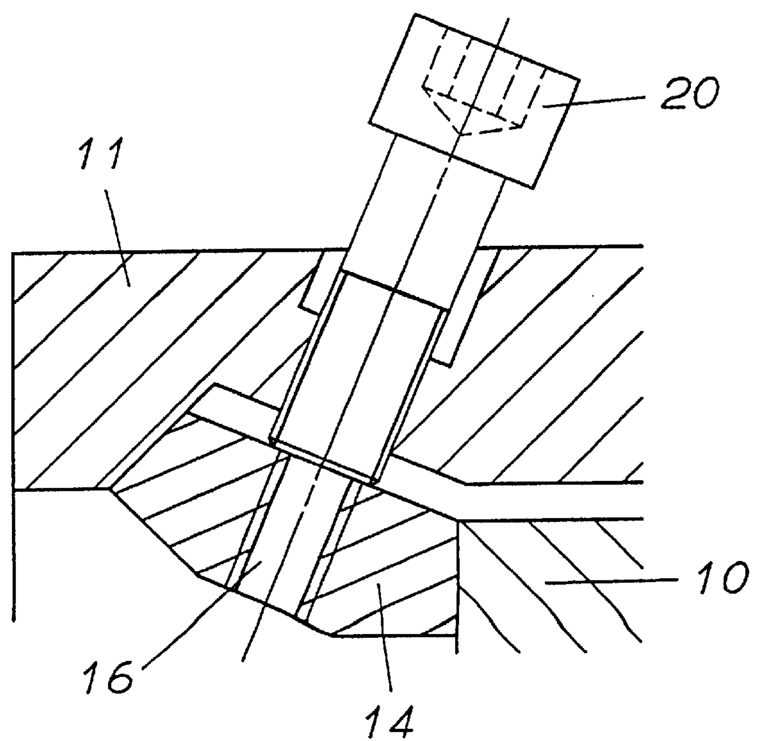
FIG. 6 is a sectional view of a tension bolt with pulling-off screw attached.

FIGS. 5 and 6 show an additional thread 23 for pulling-off screws 20 in the hole 22 for the tension bolt 15.

Figure 7:
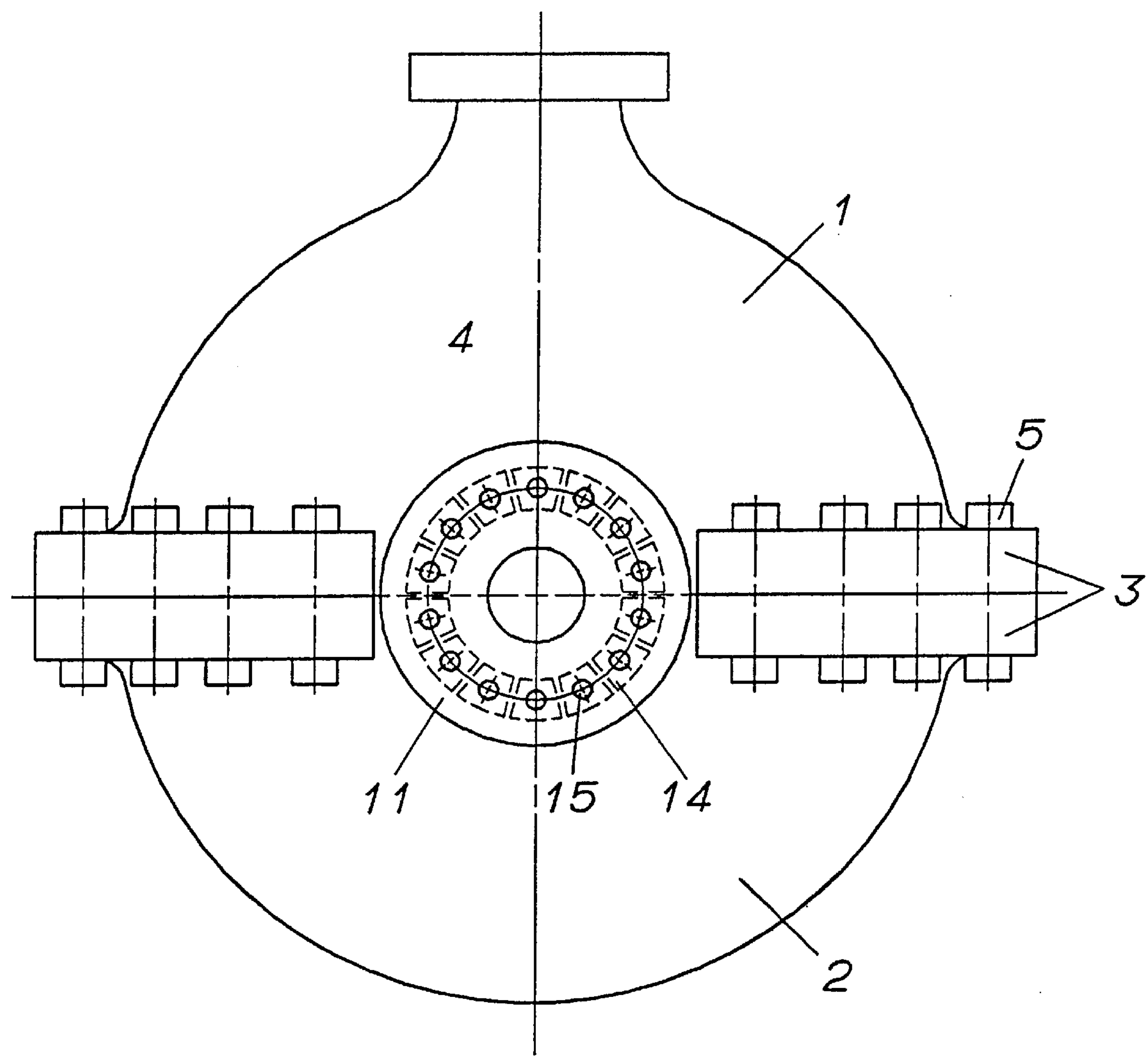
FIG. 7 is a front view of an axially split casing.

FIG. 7 shows a front view of an axially split casing, in which the casing upper part 1 and the casing lower part 2 are bolted to one another via split line flanges 3 and split line bolts 5 and wherein an axially unsplit ring 11, which, as is shown in FIG. 3, is equipped with tensioning elements 14 and tension bolts 15, is arranged in the area near the axis.

While specific embodiments of the invention have been shown and described in detail to illustrate the application of the principles of the invention, it will be understood that the invention may be embodied otherwise without departing from such principles.

What is claimed is:

1. An axially split casing comprising:

a casing upper part with a split line flange for connection;

a casing lower part with a split line flange for connection;

split line bolts for bolting said casing upper part to said casing lower part adjacent to a circumference of the axial split line flange;

an axially split casing extension of said casing upper part and said casing lower part;

an axially unsplit ring surrounding an outer circumference of said axially split casing extension, said axially unsplit ring being coaxially arranged at an end face of said casing upper part and of said casing lower part in an area of a casing axis.

2. The axially split casing in accordance with claim 1, further comprising:

wedge-shaped tensioning elements with corresponding surfaces;

tension bolts tensioning said wedge-shaped tensioning elements, said wedge-shaped tensioning elements being disposed between surfaces arranged in said ring and opposite surfaces of a collar of said casing extension.

3. The axially split casing in accordance with claim 2, wherein: contact surfaces are provided between said collar of said casing extension and said ring, said contact surfaces are designed as radially flat surfaces.

4. The axially split casing in accordance with claim 2, wherein a thread for a pulling-off screw is arranged in a hole for said tension bolt.

5. The axially split casing in accordance with claim 1, wherein contact surfaces are provided between a collar of said casing extension and said ring, said contact surfaces being designed as radially flat surfaces.

6. The axially split casing in accordance with claim 1, further comprising:

wedge-shaped tensioning elements with corresponding surfaces; and tension bolts wherein said surfaces are contact surfaces provided between a collar of said casing extension and said ring, said contact surfaces being designed as a conical surface and an axis of each of said tension bolts being inclined in the opposite direction in relation to the said casing axis.

* * * * *